United States Patent
Shin et al.

(10) Patent No.: US 7,914,940 B2
(45) Date of Patent: Mar. 29, 2011

(54) FUEL CELL PROVIDING IMPROVED STACK AND COOLING PLATE

(75) Inventors: Jae-young Shin, Seoul (KR); Seung-jae Lee, Seongnam-si (KR); Jie Peng, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 28 days.

(21) Appl. No.: 12/166,752

(22) Filed: Jul. 2, 2008

(65) Prior Publication Data

US 2009/0181272 A1     Jul. 16, 2009

(30) Foreign Application Priority Data

Jan. 15, 2008   (KR) ................ 10-2008-0004434

(51) Int. Cl.
*H01M 8/04* (2006.01)
*H01M 2/08* (2006.01)
*H05K 7/20* (2006.01)

(52) U.S. Cl. ........ 429/469; 429/456; 429/509; 429/511; 528/596; 361/711

(58) Field of Classification Search .......... 429/26, 429/36, 34, 32, 30, 35, 469, 456, 509, 511; 277/650; 361/711; 428/596
See application file for complete search history.

(56) References Cited

U.S. PATENT DOCUMENTS

| | | | |
|---|---|---|---|
| 5,284,718 A * | 2/1994 | Chow et al. | 429/26 |
| 2002/0160248 A1 * | 10/2002 | Takao et al. | 429/30 |
| 2002/0192529 A1 * | 12/2002 | Nakamura et al. | 429/36 |
| 2003/0072986 A1 * | 4/2003 | Kusakabe et al. | 429/34 |
| 2004/0048126 A1 * | 3/2004 | Shibata et al. | 429/32 |
| 2005/0248101 A1 * | 11/2005 | Oka et al. | 277/650 |
| 2005/0249997 A1 * | 11/2005 | Tomimatsu et al. | 429/35 |

OTHER PUBLICATIONS

"Viton O-Rings", Product Sheet, Allied Metrics, Sparta NJ.*
"Viton Rubber Gasket", Product Sheet, MB Traders, Secunderbad, India.*
"Operational experience of a 1kW PAFC stack", Ghouse et al., Applied Energy 65 (2000) 303-314.*
"Santoprene Thermoplastic Vulcanizate", Exxon Mobile Product Data Sheet, retrieved online on Apr. 19, 2010 from http://exxonmobilchemical.ides.com.*
"Viton O-Rings", Product Sheet, Allied Metrics, Sparta NJ., 2008. Retrieved online on Sep. 21, 2009 from http://www.alliedmetrice.com/viton-o-rings.pht.*
"Viton Rubber Gasket", Product Sheet, MB Traders, Secunderbad, India., Retrieved online on Sep. 21, 2009 from http://www.trademart.in/lead-0022987.html.*

* cited by examiner

*Primary Examiner* — Jonathan Crepeau
*Assistant Examiner* — Kenneth Douyette
(74) *Attorney, Agent, or Firm* — Stein McEwen, LLP

(57) ABSTRACT

A fuel cell stack having an improved sealing structure of a cooling plate in which the cooling plates therein each have a coolant flow channel through which a coolant flows to remove heat from the fuel cell stack and a groove that surrounds the coolant flow channel, and a sealing member disposed in the groove to prevent coolant leakage. The sealing member has a compression rate of 18 to 30%, as the compression rate being ((a thickness of the sealing member−a height of the groove)/the thickness of the sealing member)×100. Such a fuel cell stack may maintain operation for a long time without the need of supplementing the coolant.

6 Claims, 3 Drawing Sheets

US 7,914,940 B2

FUEL CELL PROVIDING IMPROVED STACK AND COOLING PLATE

CROSS-REFERENCE TO RELATED APPLICATIONS

This application claims the benefit of Korean Patent Application No. 2008-4434, filed on Jan. 15, 2008, in the Korean Intellectual Property Office, the disclosure of which is incorporated herein by reference.

BACKGROUND OF THE INVENTION

1. Field of the Invention

Aspects of the present invention relate to a fuel cell stack having stacked unit cells in which an electricity generation reaction takes place, and more particularly, to a fuel cell stack having an improved sealing structure of a cooling plate and a fuel cell having the fuel cell stack.

2. Description of the Related Art

A fuel cell is an electric generator that changes chemical energy of a fuel into electrical energy through a chemical reaction, and the fuel cell can continuously generate electricity as long as the fuel is supplied. That is, when air that includes oxygen is supplied to a cathode, and hydrogen gas which is a fuel is supplied to an anode, electricity is generated by a reverse reaction of water electrolysis through an electrolyte membrane. However, generally, the electricity generated by a unit cell does not have a high voltage to be used. Therefore, electricity is generated by a stack in which multiple unit cells are connected in series.

In the above electrochemical reaction, not only electricity but also heat is generated. Thus, in order for the fuel cell to be smoothly operated, the heat must be removed by circulating a coolant through the fuel cell stack. However, if the coolant leaks, there is a serious problem in cooling the fuel cell stack. Therefore, the sealing of coolant is important for maintaining the performance of the fuel cell.

Therefore, in order to have a smooth operation of a stack, there is a need to develop a structure of cooling plate that can strictly prevent coolant leakage.

SUMMARY OF THE INVENTION

Aspects of the present invention provide a fuel cell stack having an improved sealing structure of a cooling plate and a fuel cell having the fuel cell stack.

According to an aspect of the present invention, there is provided a fuel cell stack including: a plurality of cells in which an electrochemical reaction occurs; a plurality of cooling plates each having a coolant flow channel through which a coolant flows to remove heat from the cells and a groove that surrounds the coolant flow channel; and a sealing member disposed in the groove to prevent coolant leakage and has a compression rate of 18 to 30%, as the compression rate being ((a thickness of the sealing member−a height of the groove)/the thickness of the sealing member)×100.

According to an aspect of the present invention, there is provided a fuel cell comprising: a supply unit that supplies fuel and air; a plurality of cells in which an electrochemical reaction of the fuel and air occurs; a plurality of cooling plates each having a coolant flow channel through which a coolant flows to remove heat from the cells and a groove that surrounds the coolant flow channel; and a sealing member disposed in the groove to prevent coolant leakage and has a compression rate of 18 to 30%, the compression rate being ((a thickness of the sealing member−a height of the groove)/the thickness of the sealing member)×100.

According to an aspect of the present invention, an inner wall of the groove in contact with the sealing member may have a surface roughness of 0.11 to 14 μm.

According to an aspect of the present invention, a filling ratio of the sealing member in the groove is 50 to 90%, the filling ratio being ((a cross-sectional area of the sealing member)/a cross-sectional area of the groove)×100.

According to an aspect of the present invention, the sealing member may be a low hardness fluorine group rubber having a shore hardness of 50 or less.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
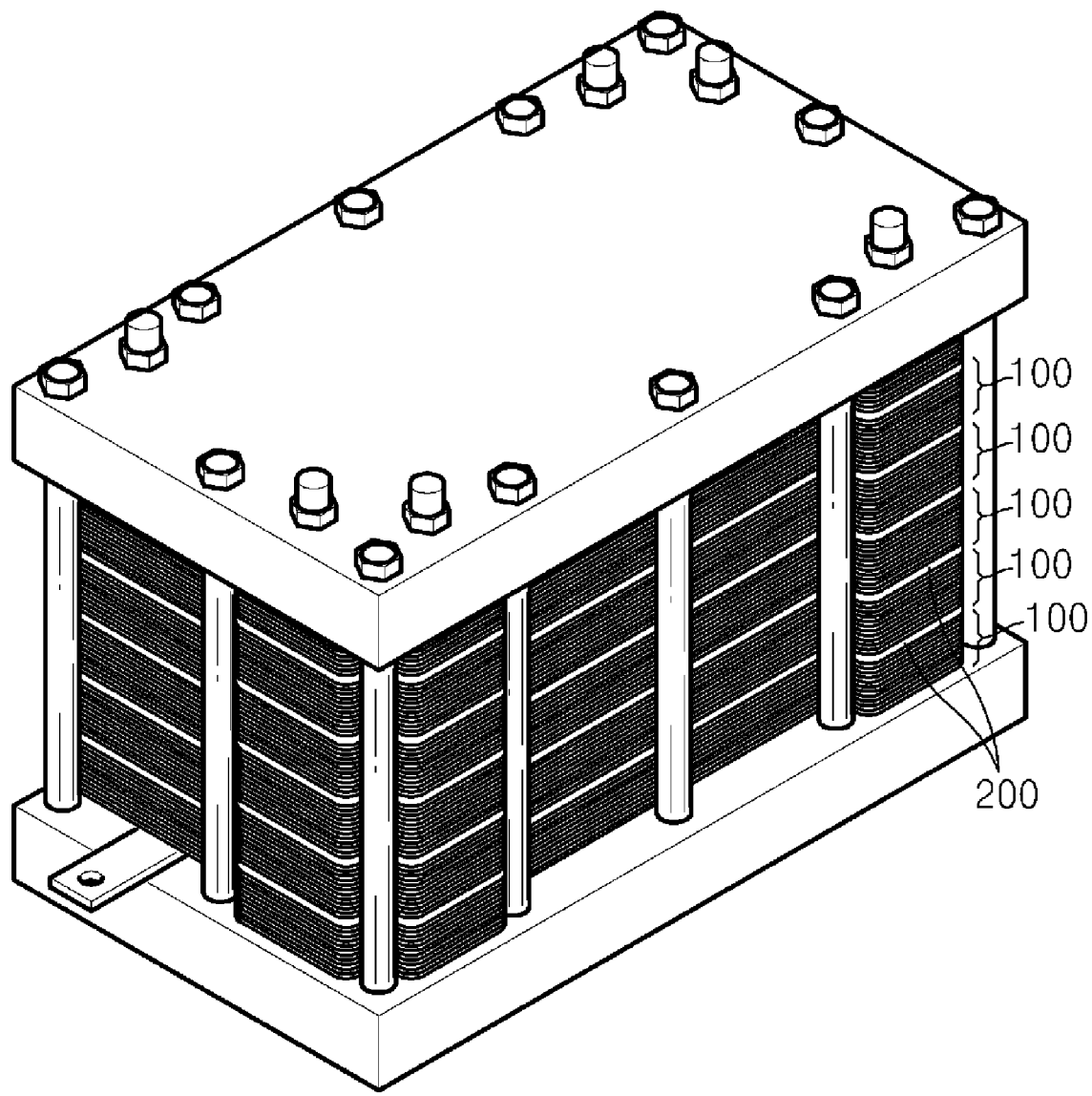
FIG. 1 is a perspective view of a stack structure of a fuel cell according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the aspects of the present invention by referring to the figures.

FIG. 1 is a perspective view of a stack structure of a fuel cell according to an embodiment of the present invention. Referring to FIG. 1, the stack 10 has a structure in which a plurality of unit cells 100 are stacked and cooling plates 200 which cool heat generated from an electrochemical reaction are installed about every 5 to 6 unit cells 100.

Each of the unit cells 100 includes an anode (not shown), a cathode (not shown), and an electrolyte membrane (not shown) disposed between the anode and the cathode. Thus, when air containing oxygen is supplied to the cathode and a hydrogen gas, which is a fuel, is supplied to the anode from a supply unit (not shown), electricity is generated as electrons flow through an external circuit from the anode to the cathode to combine with oxygen and hydrogen, which passes through the electrolyte membrane, to form water.

Figure 2:
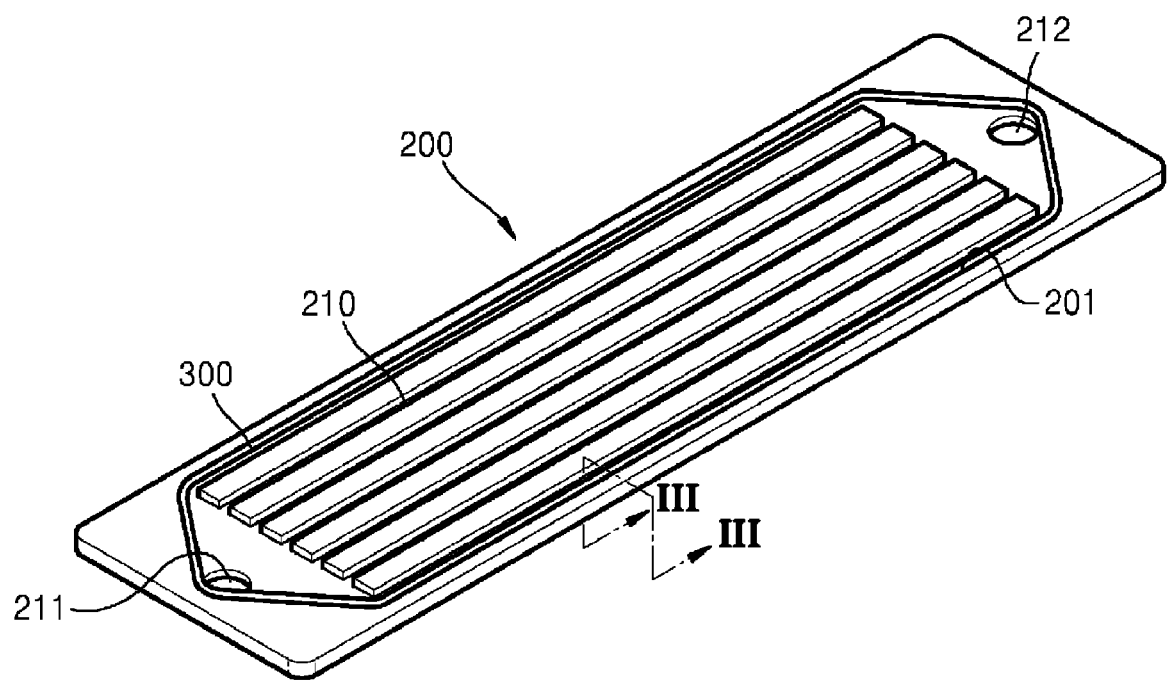
FIG. 2 is a perspective view of a cooling plate stacked in the stack of FIG. 1, according to an embodiment of the present invention.

FIG. 2 is a perspective view of the cooling plate 200 stacked in the stack 10 of FIG. 1 according to an embodiment of the present invention. Referring to FIG. 2, the cooling plate 200 includes a coolant flow channel 210 through which flows a coolant, such as cooling water or cooling oil. Thus, a coolant that enters a coolant inlet 211 absorbs heat from adjacent unit cells 100 while passing through the coolant flow channel 210. The coolant leaves the coolant flow channel 210 through a coolant outlet 212. The warmed coolant that leaves the coolant flow channel 210 is recycled after being cooled by passing through an appropriate heat exchanger (not shown).

A sealing member 300, such as an O-ring, is installed near the coolant flow channel 210 through which the coolant passes so as to prevent coolant leakage. The warmed coolant passing through the coolant flow channel 210 generally has a pressure above atmospheric, for example, of approximately 5 atm (approximately 0.5 Mpa) at a temperature of approximately 150° C. Thus, the sealing member 300 must sufficiently seal the coolant in the flow channel 210 at the above operating conditions.

Figure 3:
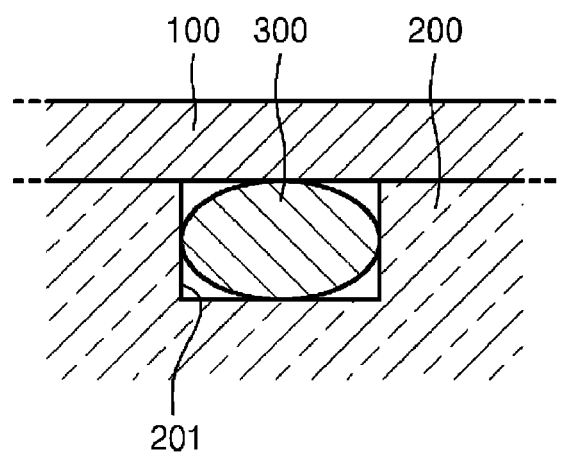
FIG. 3 is a cross-sectional view taken along line III-III of FIG. 2.

Conditions of the sealing member 300 that can strictly prevent coolant leakage will now be described. FIG. 3 is a cross-sectional view taken along line III-III of FIG. 2. First, the compression rate must be appropriate. As depicted in FIGS. 2 and 3, the sealing member 300 is installed in a groove 201 in the cooling plate 200 that surrounds the coolant flow channel 210, the coolant inlet 211, and the coolant outlet 212, and is compressed by an adjacent unit cell 100 when the unit cells 100 are stacked in the stack 10. At this point, the compression rate must be appropriate so that the stack 10 and the cooling plate 200 are appropriately sealed. The compression rate of the sealing member 300 can be calculated Equation 1 as follows.

Compression Rate=((thickness of sealing member−height of groove)/thickness of sealing member)×100    [Equation 1]

That is, the compression rate is referred to as a portion of the thickness of the sealing member 300 that is compressed into the groove 201 by the compression. The higher the compression rate, the higher the sealing function. Because gaps between the groove 201 and the sealing member 300 are reduced as much as the increased compression rate, the sealing efficiency increases. However, if the compression rate is excessive, the sealing member 300 may fail.

Figure 4:
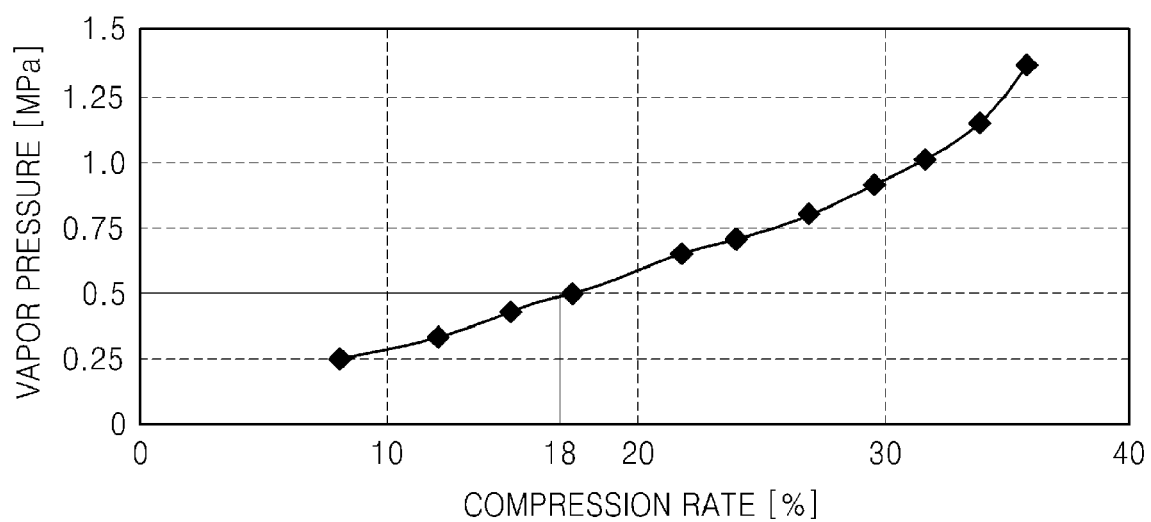
FIG. 4 is a graph showing a relationship between compression rate of a sealing member and vapor pressure.

Results of an experiment using a sealing member 300 formed of a low hardness fluorine group rubber having a shore hardness of 50 or less shows that if the compression rate exceeds 30%, breakage of the sealing member 300 occurs. Thus, the compression rate may not exceed 30%. At a compression rate of lower than the above value, for example, at 21%, leakage was approximately 3 cc per hour. However, at a compression rate of 25%, the leakage was reduced to a level of 0.07 cc per hour. Thus, the coolant leakage is reduced as the compression rate increases. As a result, if the compression rate of the sealing member 300 is determined not to exceed 30%, an appropriate sealing effect can be obtained. However, a compression rate of at least 18% is necessary. Further, as the vapor pressure increases, the compression rate must also increase to maintain the sealing effect. The minimum compression rate that can maintain the sealing effect according to vapour pressure was simulated and the results are shown in FIG. 4. Since the vapour pressure of the coolant that passes the cooling plate 200 is approximately 5 atm (0.5 Mpa), it is seen that when the compression rate is 18%, an appropriate sealing effect can be realized. Accordingly, if the compression rate is appropriately selected between 18 to 30%, the coolant leakage can be effectively prevented.

Next, the surface roughness of an inner wall of the groove 201 that contacts the sealing member 300 is another factor that affects the sealing efficiency of the sealing member 300. If the surface roughness of the inner wall of the groove 201 is too high, gaps may be generated due to insufficient contact between the sealing member 300 and the inner surface of the groove 201. Thus, the surface roughness of the inner wall of the groove 201 may have an Rmax not exceeding 14 μm.

However, if a smooth surface is used, polishing costs increase. Thus, the surface roughness may be an Rmax of 0.11 μm or above. Thus, a surface roughness of 0.11 to 14 μm is appropriate to effectively prevent coolant leakage.

Another factor that affects the sealing effect can be the filling ratio of the sealing member 300 in the groove 201. The filling ratio indicates how much the sealing member 300 fills a space of the groove 201 and can be defined as the following Equation 2.

Filling ratio=((cross-sectional area of sealing member)/cross-sectional area of groove)×100    [Equation 2]

If the filling ratio exceeds 90%, as in the case that when the compression rate exceeds 30%, breakage of the sealing member 300 can occur. However, if the filling ratio is less than 50%, one half of the space of the groove 201 is an empty space. Thus, in consideration of effective space usage and a size of the cooling plate 200, the filling ratio may be higher than 50%. Thus, the filling ratio of the sealing member 300 in the groove 201 may be 50 to 90%.

In summary, the compression rate of the sealing member 300 may be 18 to 30%, the surface roughness of the inner wall of the groove 201 may be 0.11 to 14 μm, and the filling ratio of the sealing member 300 in the groove 201 may be 50 to 90%. When the above conditions are met, coolant leakage can be strictly prevented, and thus, the cooling effect of the stack can be maintained over time. If the cooling effect is not maintained over a time, the fuel cell stack 10 must stop at least once a day to supplement the coolant; however, if the sealing member 300 is appropriately selected as described above, the fuel cell stack can maintain operation for longer than such time without the need of supplementing the coolant. Further, the sealing member 300 may be formed of a low hardness fluorine group rubber having a shore hardness of 50 or less.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cooling plate having a coolant flow channel through which a coolant flows, and a groove, which surrounds the coolant flow channel, into which a sealing member is inserted at a compression rate of 18 to 30%, the compression rate being ((a thickness of the sealing member−a height of the groove)/the thickness of the sealing member)×100,
    wherein an inner wall of the groove in contact with the sealing member has an Rmax surface roughness of 0.11 to 14 μm, and
    wherein a filling ratio of the sealing member in the groove is 50 to 90%, the filling ratio being ((a cross-sectional area of the sealing member)/a cross-sectional area of the groove)×100.

2. The cooling plate of claim 1, wherein the sealing member is a low hardness fluorine group rubber having a shore hardness of 50 or less.

3. A fuel cell stack, comprising:
    a plurality of cells in which an electrochemical reaction occurs;
    a plurality of cooling plates each having a coolant flow channel through which a coolant flows to remove heat from the cells and a groove that surrounds the coolant flow channel; and
    a sealing member disposed in the groove to prevent coolant leakage from the flow channel and that is compressed in the stack at a compression rate of 18 to 30%, as the compression rate being ((a thickness of the sealing member−a height of the groove)/the thickness of the sealing member)×100, wherein an inner wall of the groove in contact with the sealing member has an Rmax surface roughness of 0.11 to 14 μm, and wherein a filling ratio of the sealing member in the groove is 50 to 90%, the filling ratio being ((a cross-sectional area of sealing member)/a cross-sectional area of groove)×100.

4. The fuel cell stack of claim 3, wherein the sealing member is a low hardness fluorine group rubber having a shore hardness of 50 or less.

5. A fuel cell, comprising:
a supply unit to supply fuel and air;
a plurality of cells in which an electrochemical reaction of the fuel and air occurs;
a plurality of cooling plates each having a coolant flow channel through which a coolant flows to remove heat from the cells and a groove that surrounds the coolant flow channel; and a sealing member disposed in the groove to prevent coolant leakage from the flow channel and that is compressed in the stack at a compression rate of 18 to 30%, the compression rate being ((a thickness of the sealing member−a height of the groove)/the thickness of sealing member)×100, wherein an inner wall of the groove in contact with the sealing member has an Rmax surface roughness of 0.11 to 14 μm, and wherein a filling ratio of the sealing member in the groove is 50 to 90%, the filling ratio being ((a cross-sectional area of the sealing member)/a cross-sectional area of the groove)×100.

6. The fuel cell of claim 5, wherein the sealing member is a low hardness fluorine group rubber having a shore hardness of 50 or less.

* * * * *